(12) United States Patent
Davis

(10) Patent No.: US 6,570,340 B1
(45) Date of Patent: May 27, 2003

(54) STIRRING OF ELECTROCHEMICAL CELLS FOR EXTENDED LIFE

(76) Inventor: Jeffrey S. Davis, P.O. Box 7733, Gainesville, FL (US) 32635

( * ) Notice: Subject to any disclaimer, the term of this patent is extended or adjusted under 35 U.S.C. 154(b) by 270 days.

(21) Appl. No.: 09/612,588

(22) Filed: Jul. 10, 2000

(51) Int. Cl.⁷ .............................................. H05B 39/00
(52) U.S. Cl. ...................... 315/170; 315/136; 315/160; 307/77
(58) Field of Search .................. 315/170, 160, 315/291, 307, 362, 129, 133, 136; 307/77, 78, 80, 81; 362/208

(56) References Cited

U.S. PATENT DOCUMENTS

| | | | |
|---|---|---|---|
| 2,137,230 A | 11/1938 | Arden | 362/205 |
| 2,530,913 A | 11/1950 | Shackel | 362/205 |
| 4,788,452 A | 11/1988 | Stanley | 307/71 |
| 5,214,353 A | 5/1993 | Nilssen | 315/33 |
| 5,235,232 A * | 8/1993 | Conley et al. | 323/906 |
| 5,272,606 A | 12/1993 | Blaney | 362/157 |
| 5,660,460 A | 8/1997 | McLeod | 362/103 |
| 5,821,697 A | 10/1998 | Weber | 315/220 A |

* cited by examiner

Primary Examiner—Don Wong
Assistant Examiner—Thuy Vinh Tran
(74) Attorney, Agent, or Firm—Sven W. Hanson

(57) ABSTRACT

A device and method for connecting multiple electrochemical cells to a powered device in a manner to allow disconnected cells to autoregenerate while the device is powered. Devices according to the present invention have two or more cells and methods of selecting and connecting one or more of the cells to a powered device. In one embodiment, multiple push button selector switches on a flashlight each connect a cell in series to a flashlight bulb. Each cell may be thereby independently connected or disconnected from the flashlight bulb. In a preferred embodiment, a voltage control sensor-switch connected in parallel to the powered device and a power cutoff relay is provided to ensure that a user selected cell combination does not deliver a combined voltage greater than a limit for incurring damage to the powered device. Unique methods of operating such devices are also provided.

17 Claims, 7 Drawing Sheets

STIRRING OF ELECTROCHEMICAL CELLS FOR EXTENDED LIFE

BACKGROUND OF THE INVENTION

The present invention relates to battery powered devices. More particularly, the present invention is a device and method of controlling the selection and control of electrochemical cells in battery powered devices to achieve greater efficiency. The invention has particularly beneficial features when incorporated into hand-held flashlights for personal use.

Many electrical powered devices, particularly small portable electrical devices, employ primary and secondary electrochemical cells or batteries for energy storage and delivery. A primary cell is used once and replaced, while a secondary cell may be discharged and recharged multiple times. Both types of cells include many different designs and chemistries for different applications. Most electrically powered devices have a minimum supplied voltage below which continued use is generally considered impractical or undesirable. The output voltage provided by electrochemical cells decreases over time as the energy stored is released to the powered device. When the cell output voltage falls below the device minimum voltage, the cell is discarded, or must be recharged if a secondary cell. Typically in both cases, but particularly with primary cells, significant stored energy remains in the cell. In the case of primary cells, this energy is entirely wasted. A flashlight provides a good example of this. Incandescent bulbs in flashlights operate optimally within a range of applied voltages. Above a maximum voltage the filament in incandescent bulbs will quickly burn out and cease to function. Below a certain voltage range, the bulb light output falls significantly and is insufficient for most uses. This range of useful voltages is particular to each bulb design. In a battery powered flashlight, the cell or cells used are combined to provide, when the cells are new, a voltage somewhat below the maximum voltage of the flashlight bulb. As the flashlight is used, the output voltage of the cells fans as their energy is expended. The rate at which voltage decreases with energy output varies with the load on the cell and the particular chemistry of the cell. At some point, the output voltage of the cells falls to a level that provides insufficient illumination from the flashlight. Although often considered at this point "drained" or without power, in fact it is often the case that the individual cells still contain significant energy. If these cells are then replaced and discarded, this energy is lost and the cells must prematurely be treated as waste. This same phenomenon occurs in other battery powered devices.

Disposal of spent primary electrochemical cells is viewed as a significant problem for many reasons. First, the materials in the cells, and their value, is lost when the cells are discarded. Disposal of primary cells also adds to landfill volume. The most significant problem with electrochemical cell disposal is the potential ground water contamination due to leaching of the often toxic materials incorporated in cells. Efforts are underway throughout the world to reduce the amount of cadmium, lead, and mercury and other toxic materials making their way to landfills as primary cells are disposed. Any increase in utilization of primary cell capacity will reduce waste volume from the disposal and replacement of cells.

What is needed is a method and device for using electrochemical cells in which the full capacity of the cells is used before the cells need be replaced, thereby saving the environment for the world's future.

SUMMARY OF THE INVENTION

The present invention provides a device and method for powering a device with various subsets of a group of electrochemical cells, while allowing an unconnected group to remain unconnected from any load. The unconnected cells are enabled to autoregenerate thereby increasing their useful capacity. Devices according to the present invention have two or more cells and means of selecting and connecting one or more cells to a powered device. The number of combinations of cells connected to the powered device is greater than the number of cells. In one embodiment, multiple push button selector switches on a flashlight each connect a cell in series to a flashlight bulb. Each cell may be thereby independently connected or disconnected from the flashlight bulb. In a preferred embodiment, an overvoltage switch connected to the powered device and a relay is provided to ensure that a user selected cell combination does not deliver a combined voltage greater than a limit for incurring damage to the powered device. A simple power switch may also be provided to isolate the cells from the powered device. The power switch may also be incorporated into a cell selection switch.

A unique method of operation according to the present invention includes:

retaining N>1 electrochemical cells with a electrically powerable light emitting device;

sequentially connecting unique combinations of cells to the light emitting device while observing the emitted light and selecting a desired emitted illumination; monitoring an output voltage from each combination of cells; and when the output voltage exceeds a predetermined limit, automatically disconnecting the cells from the light emitting device. A key element of the overvoltage control is the use of relays or similar devices that absorb power only during switching operations in order to reduce power consumption. The elimination of impeders and other such devices that absorb power continuously during operation of the powered device reduces overall power consumption. The discrete switching operation provides opportunity for autoregeneration in the disconnected cells.

An important characteristic of the structure, and methods of using, the present invention is that the voltage, and therefore the powered device operation, is based upon extemporaneous direct user selection and control. By use of the multiple cell combinations, the user may select various power levels, in the case of a flashlight, various illumination levels. This capability in conjunction with low power consumption and autoregeneration creates unique devices providing more effective power usage. Other benefits and features of the inventions unique devices and methods will become obvious from the following details and examples.

DESCRIPTION OF THE PREFERRED EMBODIMENTS

Figure 1:
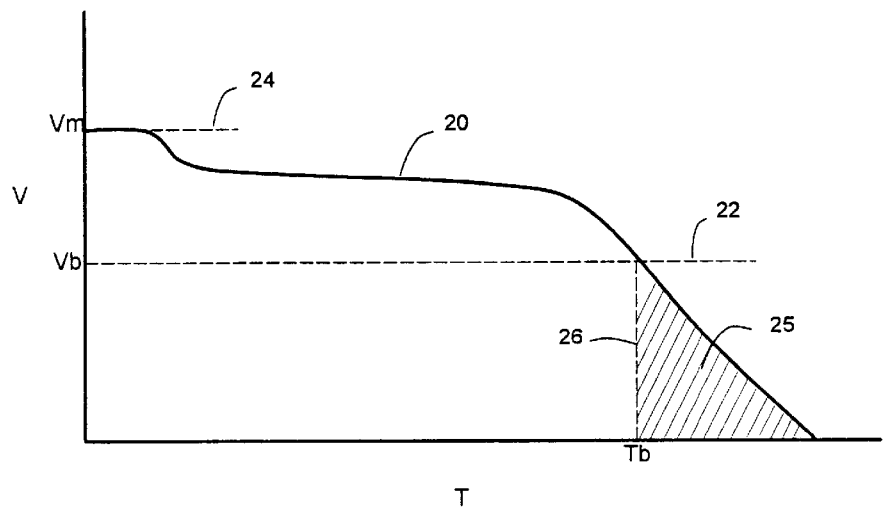
FIG. 1 is a diagram of output voltage having typical characteristics for many electrochemical cells.

FIG. 1 is a plot of output voltage as a function of time for a cell or cells connected to an external load. The voltage curve 20 has characteristics of many typical cells. The shape of the voltage curve 20 is in part a function of, and a characteristic of, the particular chemistry used in the cell. Other types of cells may have characteristic curves that vary from the curve shown, however they share the characteristics discussed herein. The required minimum voltage 22 of a selected powered device falls between the maximum cell voltage 24 and zero volts (at the horizontal axis). When the cell is first connected to the powered device its output voltage is the maximum cell voltage 24. Over time, as the cell energy is drained, the cell output voltage drops until the minimum voltage is reached, and at this minimum voltage point 26 the cell is recharged or replaced. However, the cell contains an unused portion 25 of energy available at a reduced voltage below the minimum device voltage. It is advantageous to gain useful benefit of this unused energy by application of the present invention.

Figure 2A:
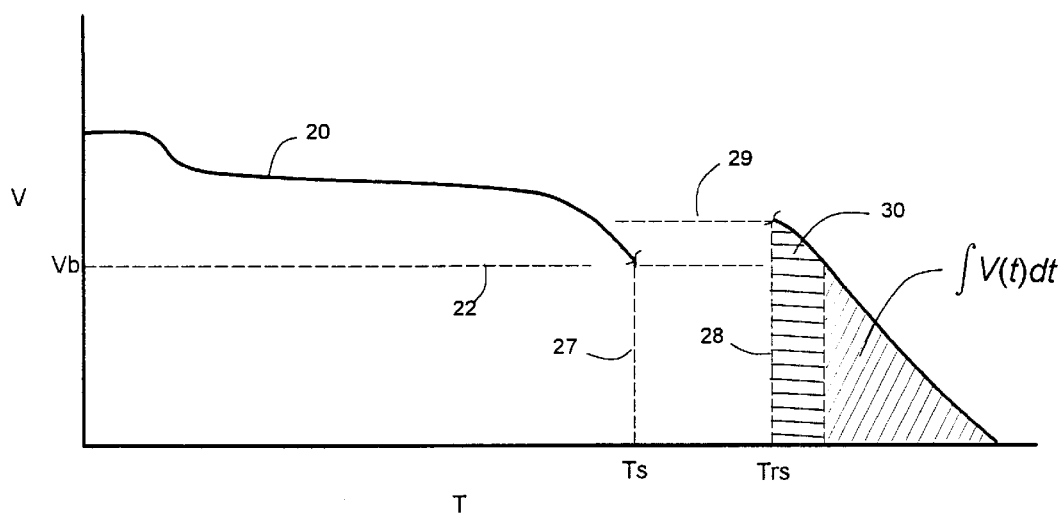
FIGS. 2a and 2b are diagrams of voltage as a function of time showing no-load "rest" periods and cell recovery during autoregeneration.
Figure 2B:
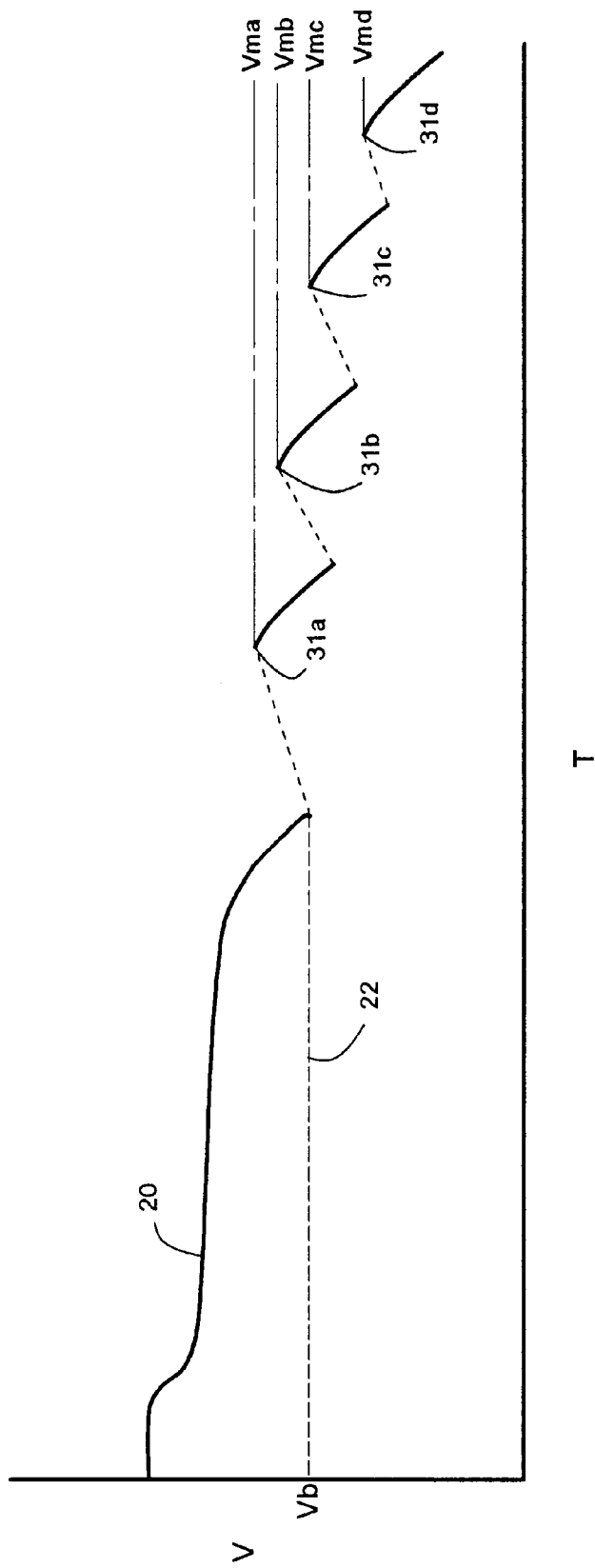

Another characteristic of many electrochemical cells is autoregeneration. Characteristics of this phenomenon are shown in FIGS. 2a and 2b. The shape of the voltage curve 20 for a cell or cells connected to a powered, device is same as shown in FIG. 1 until reaching the device minimum voltage 22 at a stop time 27 at which the cell is disconnected from all loads. If a period of time is allowed to pass during which the cell "rests", that is, remains unconnected to any load, and is then later reconnected to the powered device at a restart time 28, the restart output voltage 29 of the cell is greater than the minimum voltage 22. An additional output capacity 30 may then be obtained from the cell. The incremental capacity may be represented by the equation:

$$C = \int V(t)dt,$$

where C is capacity and V(t) is the output voltage over time. This autoregeneration is found in varying degrees in different cell chemistries and is due to the continued electrochemical interactions ongoing in the cell electrodes after the cell is disconnected. During discharge, imbalances of electrically charged electrode constituents increase the cell internal resistance. After a period of "rest", these imbalances are at least partially alleviated as the cell naturally progresses toward a steady-state condition. These interactions and the resulting autoregeneration are known by those skilled in the technology. If cells are allowed to "rest" for periods of time during the of use of a powered device, additional capacity may be obtained from the cell. A cell that has been allowed to autoregenerate to an elevated voltage and is then reconnected to a load typically will not autoregenerate a second time to the same elevated voltage. Subsequent attempts at autoregeneration will result in decreasing voltage gains. However, effective regeneration may be repeated many times with many typical cells. FIG. 2b depicts the output voltage of a cell or cells that experience repeated autoregeneration. At completion of each subsequent period of autoregeneration (31a to 31d), a corresponding reduced maximum output voltage (Vma to Vmc) is reached. Eventually, the maximum output voltage obtainable through autoregeneration may be below the required minimum voltage 22, at which time additional cells may be added to increase the resulting combined output voltage to above the minimum voltage 22.

Figure 3:
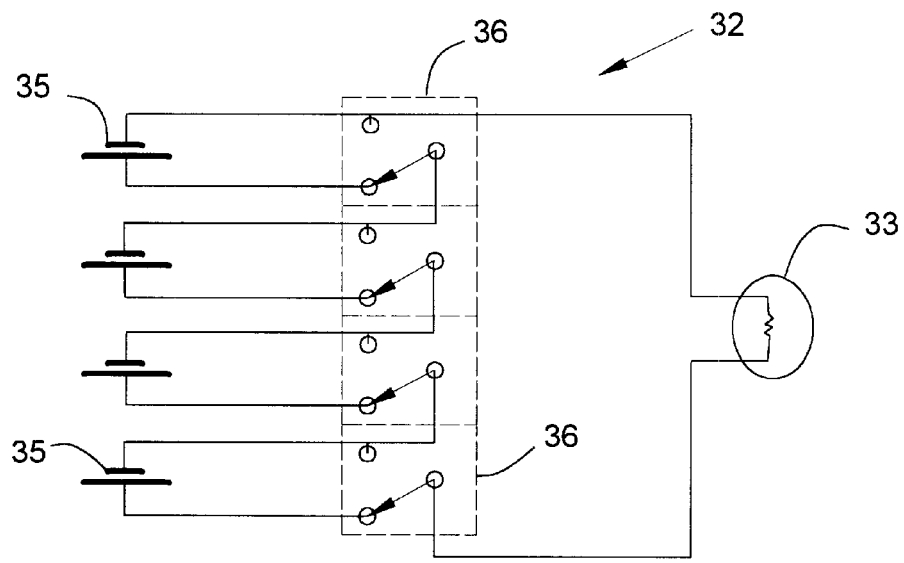
FIG. 3 is a functional diagram of one embodiment of the present invention.

FIG. 3 depicts a device for both accessing additional capacity from cells below the required minimum voltage of the associated device and for allowing regeneration of cells. A power circuit 32 is connected, and provides voltage, to a powered device such as the incandescent bulb 33 shown. The power circuit 32 includes multiple cells 35 that are each connected to the power circuit through a selection switch 36. Each selection switch 36 has at least two positions or conditions. In a first position, the associated cell is bypassed and is not actively connected to the bulb 33. In a selection switch second position, the associated cell 35 is actively connected through the power circuit 32 to supply the cell's available voltage to the bulb 33. Each cell 35 is independently connectable to the power circuit 32 in this way. The cells 35 are connected by the selection switches 36 relatively in series such that their combined connected voltages are provided to the bulb 33. The bulb 33 has a minimum voltage which must be applied for a preferred operating brightness. Various alternative combinations of cells 35 are connected in the power circuit 32 to deliver this minimum voltage to the bulb 33. The-significance and use of this approach is illustrated in the below examples.

EXAMPLE 1

Four cells are combined in a device as shown in FIG. 3. Each has an initial output voltage of 6 volts when connected to a bulb having a minimum voltage of 4 volts. The first cell is connected to the bulb by placing the associated selection switch in the appropriate position. All other cells are unconnected. As the cell energy powers the bulb, the cell voltage falls until reaching the bulb minimum voltage. At this point several operational procedures are possible.

a. In a first procedure, the first cell is disconnected and a second cell connected to the bulb. The second cell performs in the same manner as the first cell. During the time the second cell powers the bulb, the first cell undergoes autoregeneration to a voltage above 4 volts. When the second cell voltage drops to the minimum voltage of 4 volts it is disconnected and the first cell reconnected to the bulb. Although previously below the minimum voltage, autoregeneration has boosted the first cell voltage to provide additional operational time of the bulb. When the first cell voltage again drops to the minimum, it is again disconnected and the second cell reconnected, in turn, to provide additional operational time. Finally, both cells are connected in series providing about 8 volts and together power the bulb until their combined voltage output drops to the minimum voltage. Each cell output voltage is now approximately 2 volts. For each cell, the additional capacity provided by the cell between 4 and 2 volts has been accessed. This same procedure may be followed for the remaining cells.

b. In an alternative procedure, a first cell is connected to the bulb. After its output voltage drops to the minimum voltage, a second cell is connected in series with the first to power the bulb further. After their combined voltages have fallen to the minimum, a third cell is connected in series with the first two, again boosting the combined output voltage to above the minimum. Similarly, the fourth cell is subsequently connected in series to the first three. It is possible, with certain types of cells, in this procedure to actually reduce the first cell output voltage to a negative voltage at which point it could be disconnected from the power circuit.

For certain types of cells, such as many alkaline cells, a reverse charged cell will effectively prevent discharge from all other cells connected in series. In the situation in which a device power is left switched on unintentionally for long periods of time, this effect will prevent complete draining of all of the cells and retain a useful charge in the remaining non-reverse charged cells. In the power circuit 32 shown in the example above, with four cells 35 each having an initial output voltage above the minimum voltage, there are 15 cell combinations which can potentially provide at least the minimum voltage required.

EXAMPLE 2

Four cells are combined in a device as shown in FIG. 3. Each has an initial output voltage of 3 volts when connected to a bulb having a minimum voltage of 4 volts. The first and second cells are connected in series to the bulb by placing the associated selection switches in the appropriate positions. All other cells are unconnected. As the two cells' energy powers the bulb, the cell voltage falls until the combined voltage reaches the bulb minimum voltage. Each cell output voltage is then about 2 volts. The first cell is disconnected and allowed to autoregenerate. The third cell is connected in series with the second for a combined output voltage of about 5 volts. When their combined output voltage drops below the minimum voltage, the first cell may be reconnected or the fourth cell may be connected in series with the third cell or with other combinations of the first, second and third cells. An additional benefit to the sequential connection of cells as described is a preheating of the bulb filament at voltages below its maximum voltage, thereby reducing thermal shock to the filament and potentially increasing bulb life.

It is obvious from the above examples that many other combinations, and sequence of combinations, of cells may be connected to maintain a combined output voltage of at least the minimum voltage while using each cell's capacity at individual cell voltages below the minimum voltage and, for at least some cells, down to zero volts. The number of unique cell combinations of any N independent cells which can be potentially formed to produce at least a minimum voltage less than an initial single cell voltage can be determined in any case by the following, where C is the number of unique combinations of cells:

$$C = \sum_{n=1}^{N} \frac{N!}{(N-n)!n!}$$

In every case of N>1, there are more combinations than the number of individual cells. In FIG. 3 a discrete switch is associated with each cell. This arrangement provides more optimum connectability for maximum combinations of cells. Other manual switching devices are also contemplated in which a fixed multiple number of cells are engaged in each selection condition. Switches providing the above required functions are contemplated in many forms including various in which cells themselves are moved relative to fixed connection contacts. A selection switch herein includes any device performing the necessary function of interchangeably connecting cells as described.

Although flashlight incandescent bulbs have a rated or minimum voltage that provides what is determined to be an optimum illumination output, other operational modes are possible and often desirable. An incandescent bulb's rated voltage is typically close to the highest voltage that can be sustained by the bulb filament without burning out before a desired lifetime. Light energy production in incandescent bulbs is maximized when the voltage, and hence current, through the filament is the greatest. However, too high a voltage and current results in overheating and burnout of the filament. Consequently, the rated or minimum voltage for a particular bulb is typically slightly below the voltage which would quickly burnout the filament. This produces the greatest illumination while conserving the bulb. However, in many situations it is not desirable to produce the greatest illumination of which a bulb is capable. In many situations, conservation of power or minimal illumination is also, or alternatively, desired. Minimal illumination may be desired in situations such as, for example, in outdoor recreational sleeping at night, night lights for children, emergency lighting, or location indicator lights. The present invention provides a single device which can produce both near optimal illumination, and alternatively and distinctly, minimal illumination. For example, in recreational hiking and camping optimum illumination may be desired for pathfinding at night. Subsequently, a minimal illumination may be desired when preparing for sleep at night, where only low level and local area illumination is needed. The device of FIG. 3 can provide both these levels of illumination by the user selecting the appropriate combination of cells to provide different levels of voltage to the bulb producing differing levels of light energy production. Sub,optimum voltage can be obtained by selecting cells which each have a maximum output voltage less than the bulb minimum voltage. In such a case, a minimum of more than one cell would be required to provide optimum illumination. As well, a cell which has a maximum output voltage greater than the bulb minimum voltage, but which has been discharged to a voltage incapable of providing optimum illumination may provide sufficient voltage for these lower illumination situations. As well as utilizing the full cell capacity, suboptimum illumination at reduced voltage also results in slower draining of the cells' energy capacity. This is because lower voltage results in lower current. This manner of operation also conserves the cell energy when needed.

An important characteristic of the structure, and methods of using, the present invention is that the voltage, and therefore the powered device operation, is based upon extemporaneous user selection and control. A great variety of automatic voltage control devices and automatic power source swapping devices and systems are available in the prior art. However, typical automatic voltage control does not accommodate user decision-making nor variable user demands. Where users finds themselves in an unexpected situation where suboptimum illumination is desired or where cell energy conservation is desired, automatic control can not meet the user's needs. Automatic controls are typically not based on situational or external factors but on internal and preset factors. With the present invention, the user may make a self determination of his current and future needs and adjust his cell energy usage accordingly. The user may select suboptimum illumination based on extemporaneous decisions about future energy needs. For example, in emergency situations such as home power failures, a device user may manually select to operate at suboptimum voltage in anticipation of prolonged desired use of a flashlight. The devices discussed above provide the ability to make such a selection and utilize the powered device more effectively. Without the ability to manually select the combinations of cells used, such operation is not possible. Although the above examples have been expressed in terms of the powered device being a flashlight, the same concepts will apply to other electrically powered devices which are operable within a voltage range. This same reasoning also allows the user to capture most of the unused cell energy and additionally to utilize autoregeneration for increased energy duration.

Figure 4:
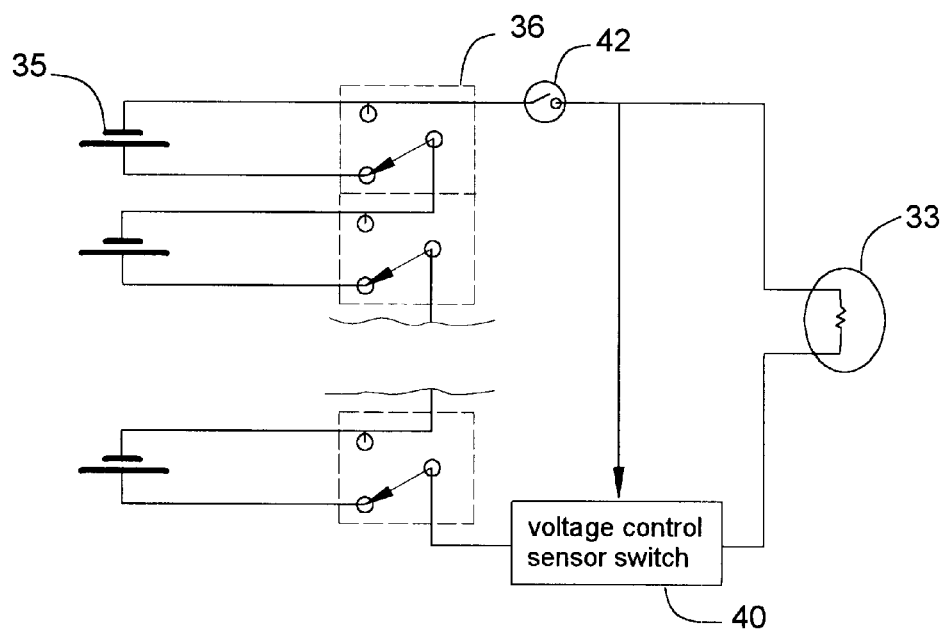
FIG. 4 is a functional diagram of an alternative embodiment with a voltage limiting device.

In the device of FIG. 3 it is possible for the user to combine the cells to apply a voltage to the bulb that will cause it to burn out too quickly or to fail immediately. It is also possible for the user, by careful monitoring of the light output as an indicator of the approximate voltage levels, to prevent overvoltage. However, to alleviate this effort and ensure that the bulb filament is not subjected to a damaging voltage, a means of overvoltage control is preferably provided in the power circuit. FIG. 4 shows such a device. In FIG. 4, multiple cells 35 are connected in series with associated selection switches 36 as in the previous figure. The overvoltage control device is a voltage control sensor-switch 40 which is placed in series between the bulb 33 and the cells 35. The voltage control sensor-switch 40 is normally closed providing no resistance to the current flow in the power circuit 32. The total combined output voltage of the selected cells is therefore applied to the bulb 33. The voltage control sensor-switch 40 has a second condition which creates an open circuit between the bulb 33 and the cells 35 to cut off voltage from the bulb 33. The open condition is activated upon the cell voltage reaching a threshold voltage which is applied directly to the voltage control sensor-switch 40. The voltage control sensor-switch 40 is designed or selected so that it will open before the voltage applied will burn out the bulb. Optionally, the voltage control sensor-switch is user adjustable for differently rated bulbs. The voltage control sensor-switch 40 may take many forms including a relay. The voltage control sensor-switch 40 is preferably reset to the closed position by opening a manual power switch 42 placed in series between the cells 35 and the voltage control sensor-switch 40. In operation, when the voltage control sensor-switch 40 opens the power circuit 32 due to an overvoltage, the user selects an appropriate cell combination to arrive at a lower voltage which the sensor-switch senses to reset itself to the closed condition. Alternatively, the user can use the manual power switch 42 to reset the voltage control sensor-switch 40 after reselection of cells. Although the manual power switch 42 is shown as a separate component, the power switch function may be integrated into one or more of the selection switches 36, or with the selection switches into a single integrated power-selection switch.

Figure 5:
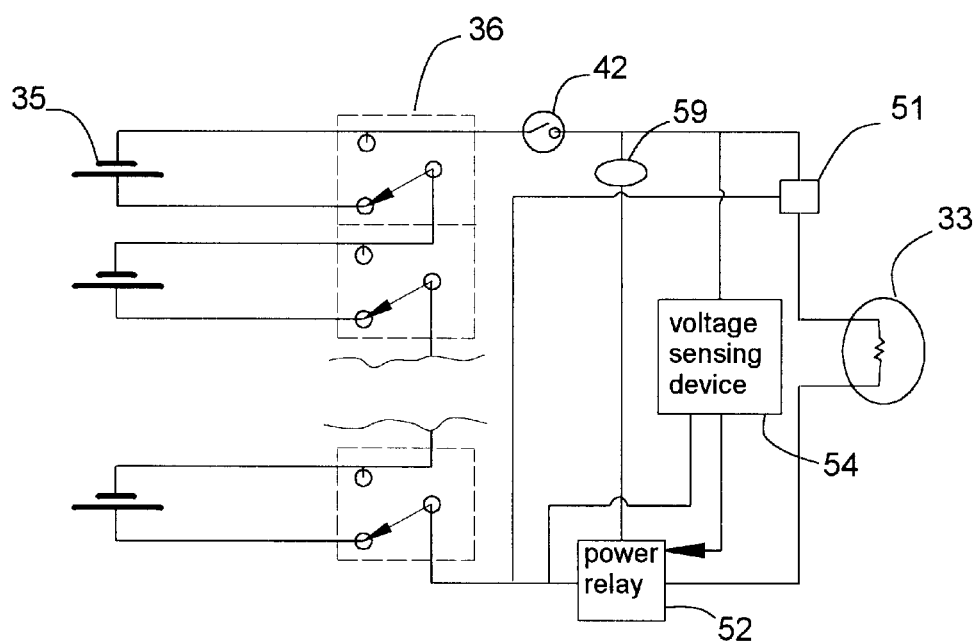
FIG. 5 is a functional diagram of a preferred embodiment.

FIG. 5 depicts a functional diagram of a preferred embodiment of the present invention as used in a flashlight. Multiple cells 35 are connected in series with associated selection switches 36 as in the previous figures. A power relay 52 is used in conjunction with a voltage sensing device 54. The power relay 52 is positioned in series between a bulb 33 and cells 35. The voltage sensing device 54 is connected across the cells 35 to receive the full cell output voltage. The voltage sensing device 54 is also connected to the power relay 52 to enable the voltage sensing device 54 to pass a controlling signal to the power relay 52. Upon detecting a cell output voltage greater than a predetermined threshold voltage, the voltage sensing device 54 passes a signal to the normally closed power relay 52, causing the power relay to open and interrupt the voltage provided to the bulb 33. When the cell output voltage is reduced to below the threshold voltage, the voltage sensing device 54 passes a signal to the power relay 52 to close again.

The voltage sensing device 54 is preferably a digital device sending a discrete digital signal to the power relay 52 which also has two discrete conditions as described: open and closed. Such digital devices can be operated with much smaller total power consumption than other devices. Simple voltage limiting devices such as analog devices including simple diodes and junction transistor devices which operate continuously in a power circuit typically consume significant amounts of energy, when the applied voltages are above, and below, the threshold voltage. Elimination of such power absorbing elements is an important element of the present invention. A circuit delay 51 is used to delay connecting cell voltage to the bulb 33 for a time sufficient to allow the voltage sensing device 54 and relay 52 to complete their functions as needed. This adds additional protection to the bulb and prolongs its life. The delay may be any of various previously existing electronic delay devices, such as inductive coils, or may be incorporated mechanically into the selection switches.

Figure 6:
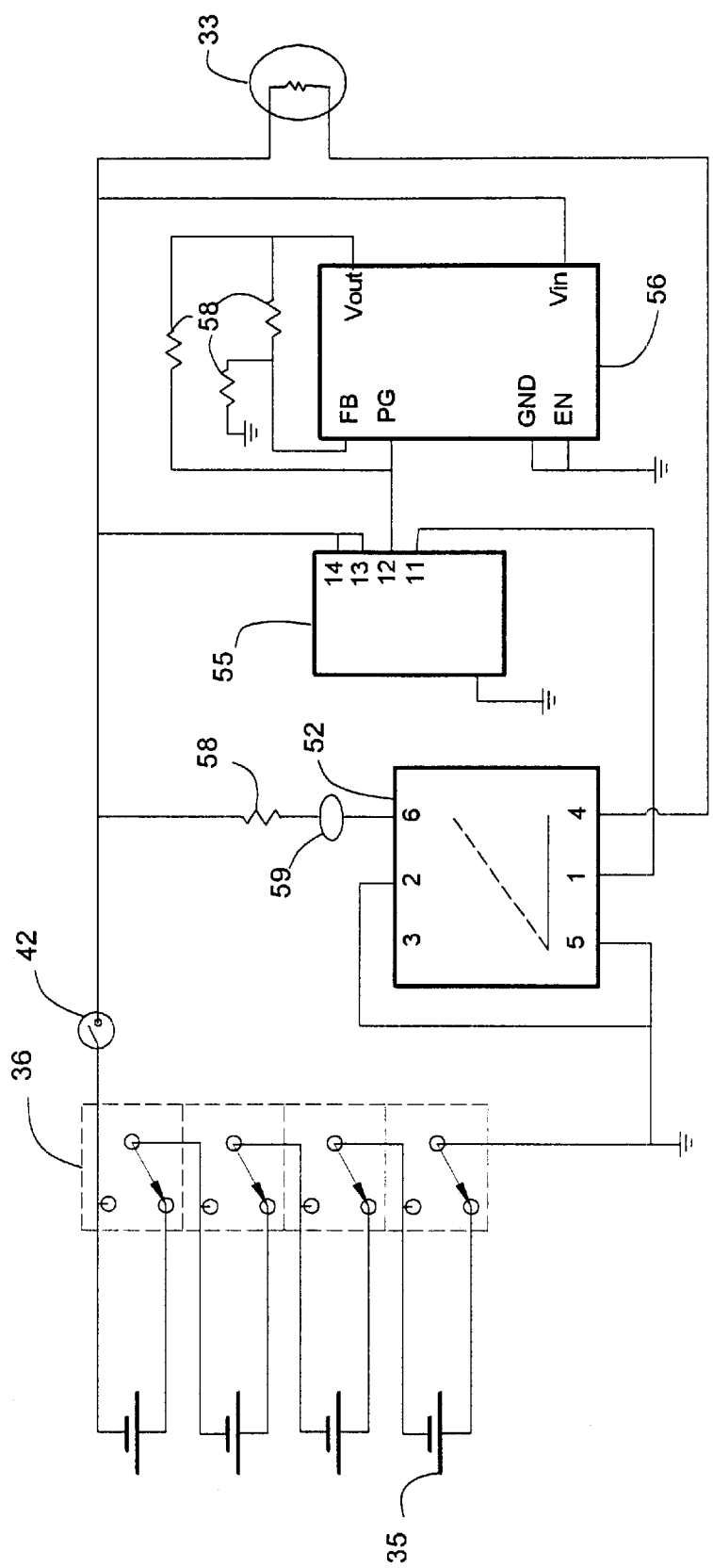
FIG. 6 is a schematic of a voltage limiting device for use with a 2.4 volt incandescent bulb according to the present invention.

An example of a preferred device for controlling voltage to a flashlight bulb is shown in FIG. 6. The bulb 33 has a rated voltage of 2.4 volts. The individual cells 35 provide 1.5 volts at full capacity. The power relay 52 is a device known as a product having designation V23040, (-A001-B201) provided by the Siemens Corporation. The voltage sensing device 54 is formed of two components: a TI 74HCO8 AND Gate (55) and a TPS 7201Q low dropout voltage power comparator/regulator (56) provided by Texas Instruments Corporation. The power regulator 56 is connected so that the output voltage from the PG pin is connected to the AND gate #12 pin (PG voltage is either zero or a positive voltage). The AND gate output signal (from its #11 pin) is connected to the relay (#1 pin). When the applied voltage at the regulator Vin pin rises above a threshold voltage, the voltage regulator sends a signal positive voltage from the PG pin to the AND gate #12 pin. When the AND gate receives the positive voltage signal at its #12 pin, it makes pin #11 positive (high). This in turn makes pin #1 of relay 52 high also. The positive voltage at the relay 52 causes the relay 52 to open the power circuit and prevent the applied voltage from reaching the bulb 33. The resistors 58 shown balance the respective line voltages to provide the proper signal and threshold voltages and pass very little current. When the applied voltage is below the threshold voltage, the regulator output voltage at the PG pin is zero, causing the AND gate to cut voltage to the relay 52 and restore or allow voltage to the bulb. In the situations where the applied voltage is too low to drive the sensor 56 and relay 52, the voltage is also below the threshold voltage and the sensor and relay are not needed. An LED 59 is connected to the other side of the relay 52 to indicate when main voltage has been interrupted by the relay. The typical power consumption of the overvoltage protection configuration shown (elements 52, 55, 56) is about 360 microwatts. This is significantly below the power consumption of most voltage regulating or limiting systems. In the present invention, power consumption of the overvoltage protection system elements (not including any LED) should be no greater than 30 milliwatts for a device such as a flashlight if efficient use of the power source is to be obtained. Power consumption of the overvoltage protection system elements is more preferably 360 microwatts or lower. This lower power consumption results in a significantly extended life of the cells and device.

To obtain the functional requirements of the respective device components described herein, the manner of connecting these components in the power circuit will be obvious to those skilled in the art. Similarly, variations will be obvious to achieve similar effects and results within the novel concepts of the present invention. Although the voltage regulator 56 and the AND gate 55 are shown as two connected devices, their functions as a voltage sensing device may be integrated into a single device. Similarly, the relay function may be alternatively integrated into a single device with the other device functions. An important aspect of the present invention is low power consumption achieved through effective selection and placement of devices. This includes reducing power absorbing elements in series with the bulb or other powered device. The examples shown use power during switching actions but absorb little or no power during times of nonuse or ongoing use of the powered device.

Figure 7:
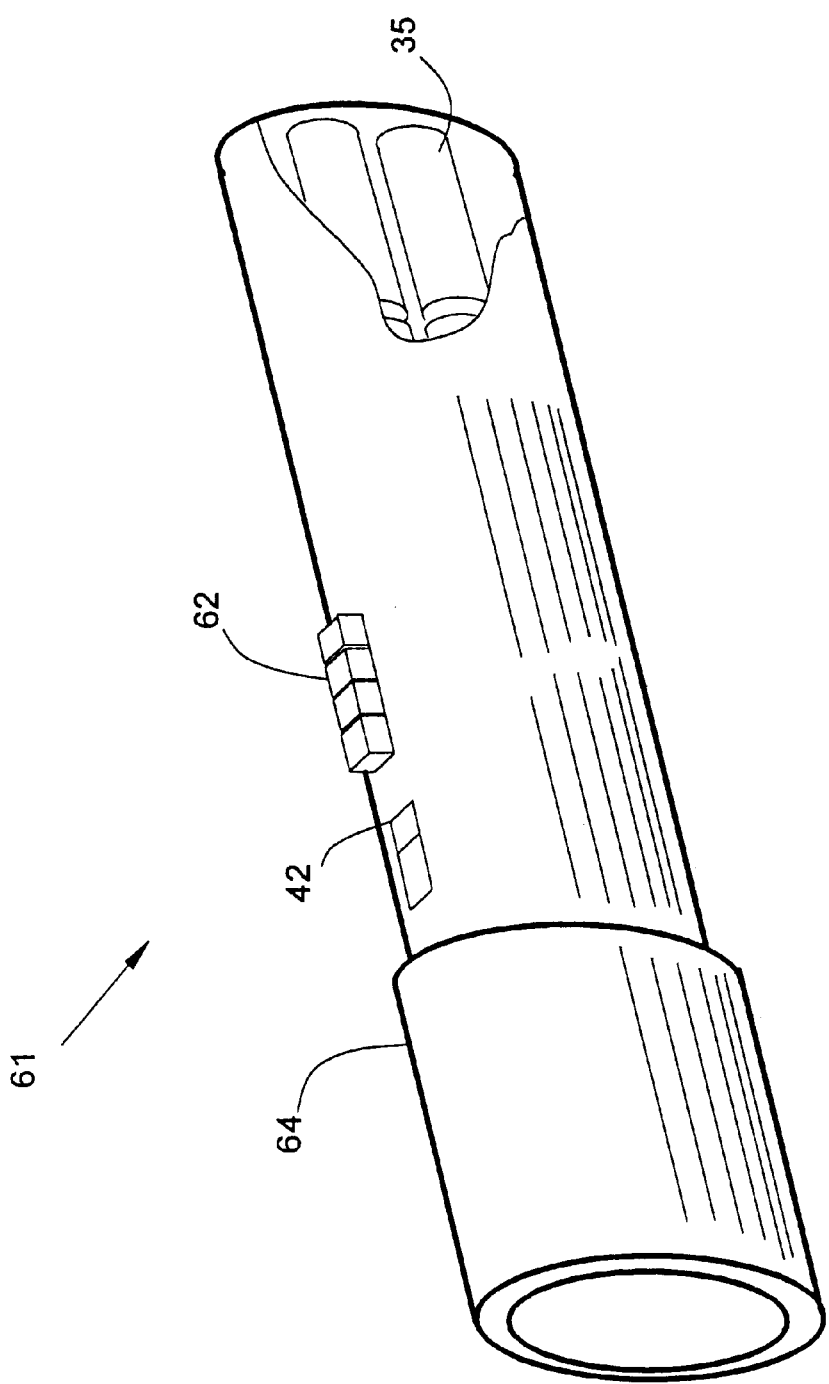
FIG. 7 is one exemplary flashlight configuration according to the present invention.

The embodiments of FIGS. 3, 4, and 5 are particularly suited for small hand-held devices. FIG. 7 depicts a flashlight 61 according to the present invention. Multiple push-button switches 62 are connected to cells 35 received in the flashlight body 64. The switches 62 are interconnected and connected to the cells to achieve the functions described in reference to FIG. 5. A manual power switch 42 is also provided.

Figure 8:
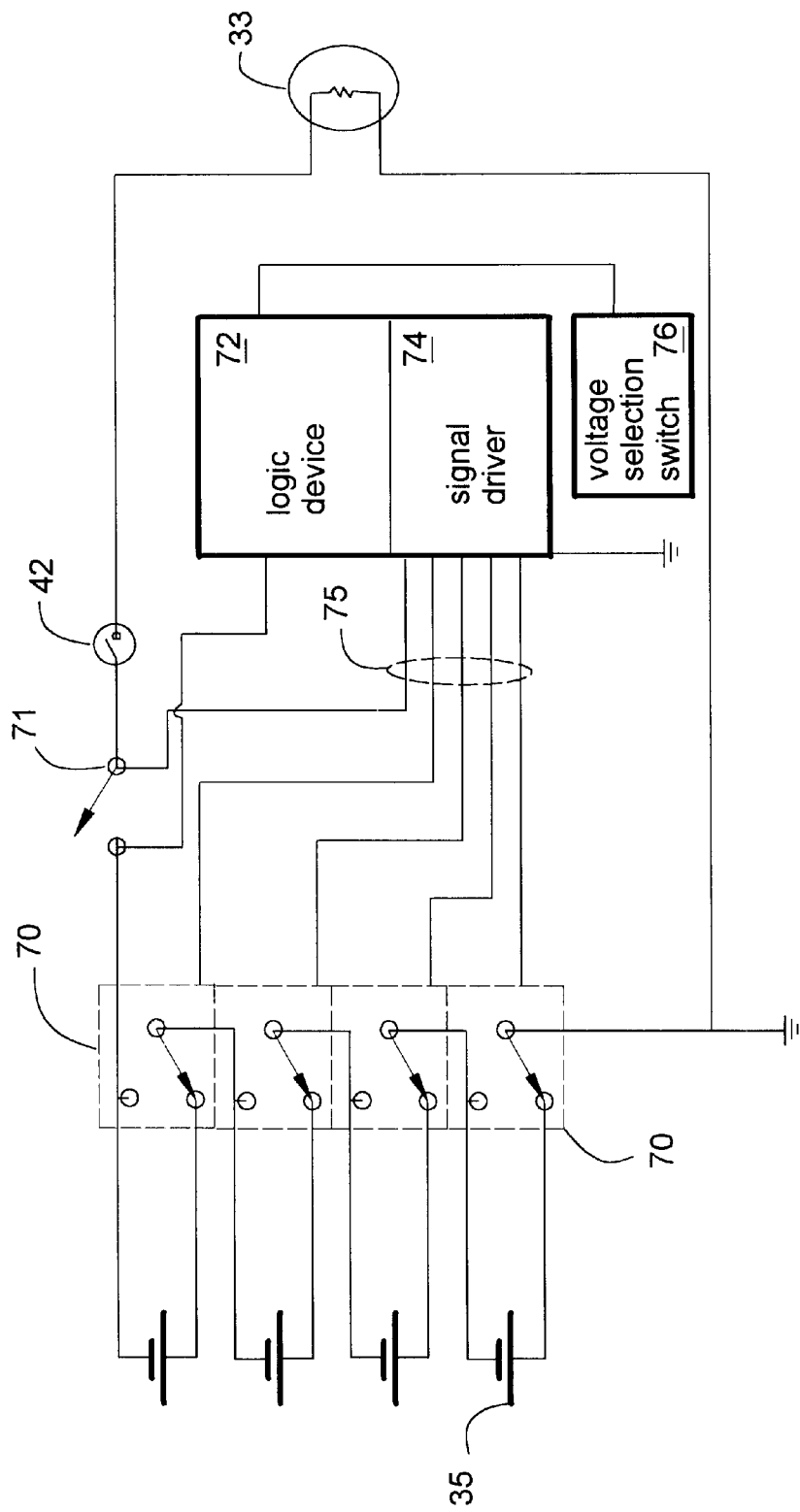
FIG. 8 is a functional diagram of an embodiment providing for automatic cell selection.

In the embodiments discussed above, the user "hunts" randomly for a cell combination that will result in a desired illumination. In alternative embodiments, a multiple of voltages (such as for dim, medium and bright illumination) are predetermined and selectable by the user while the "hunting" for appropriate cell combinations is carried out automatically by the device. In the embodiment of FIG. 8 multiple cells 35 are connectable through latching impulse relays 70 to a power circuit 32 including a powered device such as a bulb 33. The latching impulse relay is used to reduce operational power of the overall device as they use no power except when actually switching to a new state. Other devices may be used for the same function, although they should be judged based strongly on their passive power consumption. A power circuit latching impulse relay 71 also is introduced in the power circuit 32 between the cells 35 and the bulb 33. A logic device 72 and signal driver 74 are interconnected across the cells and in parallel to the bulb. The impulse relays 70 connect associated cells 35 to the power circuit 32 in a first condition. In this condition the power circuit impulse relay 71 is open isolating the bulb 33. A voltage selection switch 76 is connected to the logic device and identifies a relative voltage (brightness) desired by the user. The voltage selection switch 76 has multiple setting positions, each identify a different relative voltage. In operation, the selected voltage is compared by the logic device 72 to the combined voltage of the connected cells 35. If the combined voltage is initially greater than the selected voltage, the logic device directs a signal to the signal driver 74 which sends an impulse through an impulse line 75 to one cell impulse relay 70, thereby opening it. The reduced combined cell voltage is then compared anew. This process is repeated, closing and opening various impulse relays 70, until a desired combined voltage is achieved, upon which condition the power circuit impulse relay 71 is closed, applying the combined voltage safely to the bulb. Various algorithms, including enumeration, are contemplated for selection of cells and cell combinations depending on the number of cells, their relative maximum voltage relative to the bulb rated voltage, and the operational preferences. The functions of the logic device 72 and signal driver 74 may be achieved using various equivalent devices and combinations of devices known to those skilled in the art. A critical feature being that the components not be placed in series with the powered device and thereby result in ongoing wasteful power consumption. In this configuration, the individual cell voltages are not monitored, rather, initial selection of cells is blind with respect to their charge and the test criterium being the combined cell voltage. In alternative embodiments, a logic device monitors each cell voltage and selection of cells to achieve the desired voltage is not iterative. With these automatic embodiments of the invention, a user's means of increasing or reducing voltage is provided through a single selection switch. The selection of particular cells is made based on predefined criteria. To enhance autoregeneration, a randomness element may be introduced in the logic device to ensure each cell more probable opportunity to regenerate during repeated uses. Alternatively, a memory device may be used to track cell usage and determine future cell selection.

Other features are contemplated with the present invention. To reduce the risk of bulb burnout which is known to occur during initial voltage rush, an inductance may be connected to increase the time over which voltage rises in the bulb filament. The term "cell" as used herein and in the examples refers both to individual cells and batteries of cells.

Although the examples above are primarily with respect to flashlights, many of the inventive concepts discussed herein may be used beneficially in other powered devices. Other such devices contemplated include, but are not limited to, motors and radios. One alternative device incorporating an electric motor applies the varying voltage outputs discussed above to drive various motor speeds. In radio communication devices, variable voltage outputs can be similarly used to reduce volume or transmitter power to conserve energy.

The preceding discussion is provided for example only. Other variations of the claimed inventive concepts will be obvious to those skilled in the art. Adaptation or incorporation of known alternative devices and materials, present and future is also contemplated. The intended scope of the invention is defined by the following claims.

I claim:

1. A high efficiency electrochemical cell powered device enabling more useful and more complete exhaustion of cells and enabling autoregeneration of cells, comprising:

N electrochemical storage cells, and N is an integer greater than 1;

a powered element;

at least one manually operable selection switch; the selection switch having at least N conditions, each defined by a unique combination of the cells therein connected to the powered element, each combination having an associated combined voltage; and each cell singly disconnected from the powered element in at least one of the conditions.

2. The high efficiency electrochemical cell powered device according to claim 1, further comprising:

a voltage control switch, the control switch having discrete open and closed conditions, the control switch connected to the powered element to detect the voltage applied from the connected cells in any condition and disconnecting the cells from the powered element when the combined voltage exceeds a predetermined threshold.

3. The high efficiency electrochemical cell powered device according to claim 2, wherein:

the powered element is a light emitting bulb.

4. The high efficiency electrochemical cell powered device according to claim 3, further comprising:

a hand-holdable flashlight body; all other elements being retained within the body.

5. The high efficiency electrochemical cell powered device according to claim 4, wherein:

the at least one selection switch comprises: N independent selection switches, each connecting, in series with all other connected cells, a single associated cell to the power element.

6. The high efficiency electrochemical cell powered device according to claim 5, wherein:

each of the independent selection switches is a push button switch accessible on the flashlight body.

7. The high efficiency electrochemical cell powered device according to claim 6, further comprising:

a power switch connected to the power element and capable of disconnecting the cells from the power element in any condition.

8. The high efficiency electrochemical cell powered device according to claim 2, wherein:

the voltage control switch comprises:
a voltage sensing device connected to a relay; the voltage sensing device causing the relay to disconnect the cells from the powered element when the combined voltage exceeds the predetermined threshold.

9. The high efficiency electrochemical cell powered device according to claim 8, wherein:

the voltage control switch consumes no more than 30 milliwatts of power in any condition when the relay is in a closed condition.

10. The high efficiency electrochemical cell powered device according to claim 9, wherein:

the voltage control switch consumes no more than 360 microwatts of power in any condition when the relay is in a closed condition.

11. The high efficiency electrochemical cell powered device according to claim 10, wherein:

the voltage sensing device is a low dropout voltage comparator.

12. The high efficiency electrochemical cell powered device according to claim 1, wherein:

each of the cells is a primary cell.

13. A method of connecting a plurality of electrochemical cells to a light emitting device to maximize the useful life of the cells, the method comprising;

retaining N electrochemical cells with a electrically powerable light emitting device, N is an integer greater than 1;

sequentially connecting unique combinations of cells to the light emitting device while observing the emitted light and selecting a desired emitted illumination;

monitoring an output voltage from each combination of cells; and when the output voltage exceeds a predetermined limit, automatically disconnecting the cells from the light emitting device.

14. The method of claim 13, further comprising:

upon disconnecting the cells, automatically illuminating a visible signal.

15. The method of claim 14, further comprising:

upon disconnecting the cells, automatically emitting an audible alarm.

16. A high efficiency electrochemical cell powered device enabling more useful and more complete exhaustion of cells comprising:

N electrochemical cells, and N is an integer greater than 1;

a powered element;

a manually operable selection switch having at least two conditions; the selection switch in each condition identifying a unique voltage;

means of comparing the output voltages of combinations of one or more cells to a selected unique voltage, and automatically connecting to the powered element, a combination of the cells having a maximum combined voltage that is less than the selected voltage;

the selection switch connected to the comparison and connection means.

17. The device of claim 16, wherein:

the powered element is an illuminating bulb.

* * * * *